No. 704,864. Patented July 15, 1902.
J. L. CREVELING.
SYSTEM OF ELECTRICAL DISTRIBUTION.
(Application filed Dec. 7, 1900.)
(No Model.)
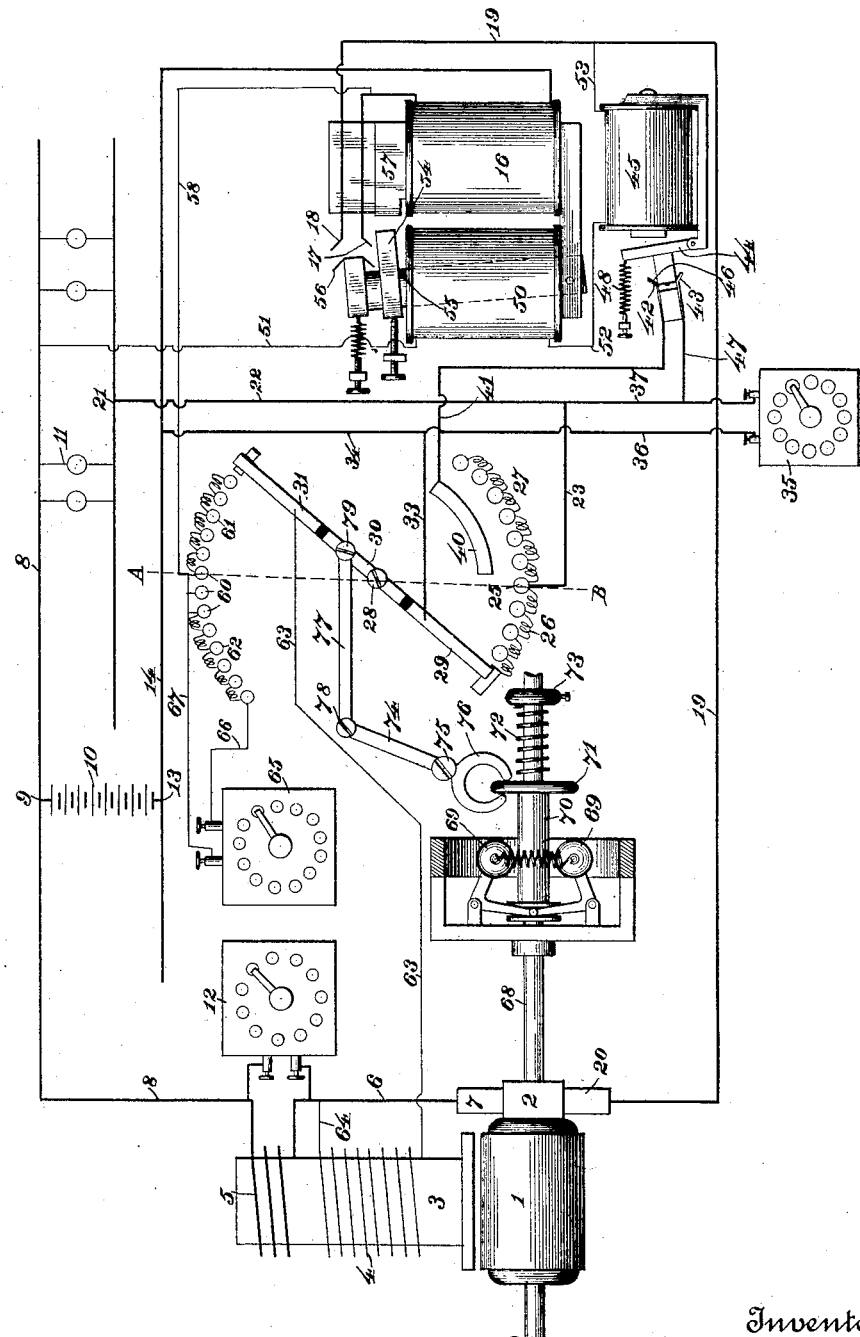
Witnesses
H. S. Austin
Karl S. Daniel
Inventor:
John L. Creveling
By Joseph L. Atkin
Attorney

UNITED STATES PATENT OFFICE.

JOHN L. CREVELING, OF NEW YORK, N. Y.

SYSTEM OF ELECTRICAL DISTRIBUTION.

SPECIFICATION forming part of Letters Patent No. 704,864, dated July 15, 1902.

Application filed December 7, 1900. Serial No. 39,052. (No model.)

*To all whom it may concern:*

Be it known that I, JOHN L. CREVELING, of New York, in the county of New York, State of New York, have invented certain new and useful Improvements in Systems of Electrical Distribution, of which the following is a complete specification, reference being had to the accompanying drawings.

My invention relates to an improved system of electric lighting by power taken as from a car-axle or other variable source.

A system to which my invention is applicable comprehends the employment of a storage battery in connection with a generator driven as by connection with an axle of the car upon which the system is installed. The battery is designed to afford an uninterrupted source of current to the system, which may be supplied and the battery replenished while the car is in motion from the generator.

The object of my invention is to provide means for automatically preserving a practically uniform flow of current through the lamps of the system and at the same time for protecting the system against waste of energy or other loss under the widely-varying conditions to which the system is in operation subjected.

In the accompanying drawing I illustrate diagrammatically and solely for the purpose of affording an explanation of its principle one form of embodiment of my invention.

Referring to the numerals on said drawing, 1 indicates the armature, 2 the commutator, and 3 the field-magnet core of a dynamo or generator of any suitable type, it being in the drawing illustrated as provided with a field energizing-coil 4 and a differential compound coil 5, whose functions will hereinafter appear. The generator is for convenience assumed to run only in one direction; but it is obvious that it might be provided with any one of the well-known pole-changers by aid whereof the direction of rotation of its armature would be rendered immaterial. Upon the assumption specified, 6 designates the positive lead, connecting the positive brush 7 of the generator with one terminal of the compound coil 5, from the other one of which a main 8 leads to the positive pole 9 of a storage battery 10 and also to the lamps or translating devices 11. An adjustable resistance or rheostat 12 is placed in shunt with the compound coil 5 and affords means thereby of regulating to suit the service the proportion of current which shall circulate through said coil. From the negative pole 13 of the battery 10 a main 14 leads to one end of the winding 16 of the main-circuit switch, which is preferably the one shown and described in United States Letters Patent No. 644,409, issued to me February 27, 1900, to which reference may be had for details not herein specified. The other end of said winding 16 communicates with a contact-piece 17, which is insulated from but held in proper correlative position to the contact-piece 18, from which the main 19 leads to the negative brush 20 of the generator.

21 represents the remaining one of the lamp-mains, being in connection with the negative terminals of the lamps or translating devices 11. It connects, as through wires 22 and 23, with a contact 25, forming one of a number of segmentally-disposed contacts constituting on opposite sides of the plate 25 variable-resistance devices 26 and 27.

Pivoted at 28 is a lever divided into three sections 29, 30, and 31, that are severally insulated one from the other. The lever-section 29 is always in contact with some one of the contacts of the resistance devices 26 27 or the contacts 25 and is connected with the negative pole of the battery, as by wires 33, 34, and 14. A variable resistance or rheostat 35 is placed in shunt across the resistance inserted by the lever-section 29, as by wires 36 and 37, connected with wires 23 and 33, respectively, and is adapted thereby to afford means of determining the variations of resistance inserted by said lever-section.

40 indicates a metallic segment so disposed as to engage the lever-section 29 after it has passed the contact 25. It is connected, as by a wire 41, with a contact-piece 42, which being in fixed relation to but insulated from a contact-piece 43 is adapted, when the hinged armature 44 of the magnet 45 is in the position shown in the drawing, to communicate through the conductor 46 upon the armature with the piece 43, and thence through the wire 47 with the wire 37. The position of the armature 44 shown in the drawing is normally maintained by the adjustable spring 48 attached to it—that is, until the magnet 45 be sufficiently energized to overcome the resistance of said spring.

In view of the foregoing it will appear that if the lever-section 29 swing beyond the contact 25 it will make contact with the segment 40, and the armature 44 being in its normal position illustrated the resistance 27 will be short-circuited regardless of the position of the lever-section 29 upon the individual contacts composing the said resistance 27.

50 indicates the actuating-magnet of the main switch, and it, as well as the magnet 45, derives current from the generator, as by wires 51, 52, and 53, the two magnets being thereby placed in series with each other and in multiple across the mains 8 and 19.

54 indicates the pole-piece of the movable core 55 of the magnet 50, and 56 a contact-plate carried with, but insulated therefrom. The office of the plate 56 is to establish electrical connection between the contact-pieces 17 and 18 when the pole-piece 54 is attracted by the pole-piece 57 of the adjacent magnet. From one end of the winding 16 of said last-named magnet, as well as from the contact-piece 17, a wire 58 leads to a group of contacts 60, upon the opposite sides of which, in segmental order therewith, are disposed variable resistances 61 and 62, which with respect to their functions may be designated "field resistances." They are so called because through the movement of the lever-section 31 they are enabled to determine the amount of resistance in the field-circuit, the lever-section 31 being in electrical connection, as through the wire 63, with the field energizing-coil 4, with which the wire 64 connects the lead 6.

65 indicates a rheostat or variable resistance in shunt across the resistance 62, as by wires 66 and 67, whereby the effect of resistance 62 may be, within certain limits, regulated.

68 indicates the armature-shaft, which is provided with a centrifugal governor—such, for example, as that shown in my United States application for patent, Serial No. 28,525, filed August 30, 1900. 69 indicates centrifugally-actuated balls or weights comprehended by such governor and which are operatively connected with the collar 70 of a disk 71, so that the speed of rotation of the armature is made to determine the position of said disk upon the shaft 68. The spring 72 and slip-collar 73 are used for adjustment to speeds necessary to give the disk 71 a certain position.

74 indicates a lever which, pivoted, as indicated at 75, and operatively connected with the disk 71 at one end, as indicated at 76, is at its other end linked, as by the member 77, to the medial lever-section 30, the member 77 being pivotally united at its opposite ends, respectively, to the lever 74 and the section 30, as indicated by respective numerals 78 and 79. In consequence of said connections the position of the lever of which 30 is a part is made dependent upon the speed of rotation of the dynamo-armature.

The operation of my system is as follows, assuming the generator to be at rest and all parts of the apparatus to be in the several positions shown in the drawing: The generator being at rest, the main switch is open and flow of current is interrupted thereby, owing to the break between the contact-pieces 17 and 18, while flow of current from the battery through the coil 4 will be interrupted, owing to the position of the lever-section 31—that is to say, disconnected from the resistance 61. Current, however, will flow from the battery 10, main 8, and translating devices 11, or the lamps, from which return is made through wires 22 and 23, variable resistance 26, lever-section 29, wires 33 and 34, and main 14 to the negative pole 13 of the battery 10. From the circuit last traced a portion of the current divides and passes through wire 37, variable resistance 35, and wire 36. If now the armature 1 begins to revolve in the proper direction, centrifugal force generated by the rotation of its shaft 68 will cause the balls 69 to fly outwardly, thereby actuating the disk 71, and through it the lever 74 and the sectional lever to which it is linked. The spring 72 is usually adjusted so that the disk 71 will meet it when the sectional lever coincides with the line A B on the drawing. As the sectional lever starts to swing its section 31 passes over the contacts of the variable resistance 61 successively, thereby first establishing a connection between the storage battery and the field and then gradually decreasing this resistance step by step as the contacts are successively passed until all the resistance is withdrawn at a time when the axis of the lever coincides with the line A B. By employing a considerable number of contacts in the resistance 61, and thereby increasing the number of steps by which the resistance is cut out, all vicious sparking may be suppressed and all danger of puncturing the field when the current is withdrawn is avoided. The field energizing-circuit established by contact between the lever-section 31 and the contacts of the resistance 61 is completed with the battery through the following elements: from the positive pole 9 of the battery 10, main 8, differential coil 5, and shunt 12, to lead 6; from lead 6 through wire 64, coil 4, wire 63, lever-section 31, variable resistance 61, (or the contacts 60, as determined by the position of the lever-section 31,) wire 58, winding of the magnet 16, and wire 14 to the negative pole 13 of the battery 10. It is obvious that this energizing-circuit throws an extra load on the battery over and above that of the translating devices which it was before carrying. This of course tends to cause some drop in the line in addition to the drop caused by the internal resistance of the cell. Ordinarily the switching on of the shunt-coil or field energizing-circuit, as above specified, would cause the lamps of the translating devices 11 to be slightly dimmed; but that objectionable result is obviated by my apparatus in the following manner: As the sectional lever swings in the direction above specified the section 29 at the same time sweeps across the variable resistance 26 and cuts out a small variable resistance which was thereby placed in circuit with the battery and lamps. In that manner compensation is made for the drop caused by the extra load upon the cells or battery, and the lamp-circuit voltage is caused to continue practically constant, provided, of course, that the said resistance be properly adjusted to the lamp-load. When the limit is reached by the attainment of the sectional lever to the position in which it coincides with the line A B, the field-coil is receiving its full excitation and the lamps the full voltage of the battery. The voltage of the generator at that speed which sets the sectional lever in the position in which it coincides with the line A B should be about equal to that of the battery, and the current flowing from the generator through lead 6, differential coil 5, and shunt 12, wire 8, wire 51, windings of the magnets 50 and 45, respectively, wire 53, main 19 to the generator should have caused the magnet 45 to attract its armature 44 before the line voltage is reached, thus separating contact-pieces 42 and 43 and breaking the circuit. When the voltages from the generator and battery are about equal, the main switch closes by contact between the plate 56 and the contact-pieces 17 and 18. Current now flows from the generator through lead 6, coil 5, rheostat 12, main 8, battery 10, wire 14, winding of magnet 16, contact 17, plate 56, contact 18, and wire 19 to the generator. The establishment of this circuit tends to cause the voltage of the battery to rise slightly, but will also cause the sectional lever to pass beyond the position indicated by the line A B, from which position further movement thereof causes the resistance 27 to be inserted in the lamp-line. The amount of resistance that shall be inserted by such movement may be adjusted, as by varying the resistance of the rheostat 35, which is in shunt with said lamp resistance 27. As the speed of the generator increases the voltage, and of course the quantity of current supplied to the line, will also increase, and some of the contacts of the field resistance (indicated at 60) are connected, so as to allow some variation in speed to correspond with a permissible difference in speed between the minimum and maximum current. While the speed is being increased so as to drive the lever-section 31 between the contacts 60, the shunt resistance remains continuously practically *nil;* but the lamp resistance is caused to vary with this increase of speed through the movement of the lever-section 29 across the contacts of the resistance 27, thereby holding the voltage upon the lamp-circuit practically constant. Now if the speed continue to increase beyond the limit at which the lever-section 31 makes contact with one of the contacts 60 the resistance 62 is inserted into the field-circuit, thereby cutting down the current in the coil 4. Consequently the output of the generator is held practically constant. The amount of resistance that shall be inserted by the variable resistance 62 through the movement and contact therewith of the lever-section 31 may be governed within certain limits by varying the resistance of the rheostat 65 in shunt therewith. The addition of the resistance 62 will vary the current supplied by the generator without appreciably varying the electromotive force thereof, inasmuch as a differential compound machine is employed the compound coil of which is used principally for merely steadying the voltage, and the influence of this coil upon the generator may be governed by varying the shunt resistance of the rheostat 12. So long as the generator continues to increase in speed resistance will be inserted in the lamp-circuit; but so soon as the generator has reached its full output the additional resistance inserted in the lamp-circuit may be practically *nil,* merely sufficient to counterbalance the increase in the voltage in the battery due to receiving some current. Should the generator now slow up somewhat, the lamp resistance would be lowered somewhat, as also the resistance of the field-circuit, which of course would tend to hold the generator with a constant output until the lever-section 31 reaches one of the contacts 60. As the speed lowers from this point the voltage of the generator will drop, and when equal to that of the battery the main switch will open. If the speed fall still lower, the lever-section 31 will swing across the contacts of the variable resistance 61, cutting the field-circuit down step by step until almost *nil* and finally breaking the circuit when it reaches the position illustrated in the drawing. Lamp resistance will be thrown out until the sectional lever coincides with the line A B, at which point there will be no "artificial resistance" in the lamp-line nor in the field-circuit, and then as resistance is inserted in the field-circuit a small resistance is also inserted in the lamp-circuit to counteract the rise in voltage upon the lamp-line due to the cutting out of the field. If the generator come to a stop, there will be no current wasted by flowing back through the field, and the lamps will be lighted from the battery through a small external resistance. Should the rotation of the armature reach critical speed without generating the proper voltage, as would be the case, for instance, if the wires connecting the energizing-coil to the battery should be broken, the lever-section 29 would swing across the contacts of the resistance 27, as usual, but would cause no resistance to be inserted into the lamp-line, inasmuch as the lever-section 29 would make contact with the segment 40, thereby causing the variable resistance to be short-circuited to the contact through the wire 41, contact-pieces 42 and 43, contact-plate 46, and wire 47. This short circuit would be available under conditions specified, because the magnet 45 would not be energized by the generator.

It is obvious that the switch comprehending the magnet 45 and its armature 44 might be suppressed, inasmuch as the variable resistance 35 could be cut out by a trainman as soon as he noticed that his lights were varying in intensity, and this would short-circuit the resistance 27, as will be apparent from the drawing. By means of the two variable resistances or rheostats 12 and 65 the generator and its governor may be adjusted for the services required and the generator made to give its full output for a considerable range in variation of speed. The rheostats 12, 65, and 35 should be in a car-lighting system accessible from within the car. The rheostats 12 and 65 would not need very many steps; but the rheostat 35 should be provided with such a number as to make it possible to gradually insert the resistance, so as to adjust the resistance in each lamp-circuit through the internal resistance of the particular battery which might be used and the wiring on the car. By proper adjustment of these resistances and proper selection of the resistance 26 the intensity of the lamps or translating device 11 may be held practically constant regardless of the speed of the train, and the battery by proper adjustment of the rheostats 12 and 65 may be caused to receive their full charging current and no more from about one-half to the full speed of the car.

What I claim is—

1. The combination with a system of electrical distribution, comprising a generator, storage battery and translating devices in electrical communication through a main circuit, the battery dividing from the main circuit, in effect, a lamp-circuit deriving energy directly through the battery, of means for increasing or diminishing resistance in the lamp-circuit upon increase or decrease of battery-current to the field-circuit.

2. The combination with a system of electrical distribution, comprising a generator, storage battery, and translating devices, in electrical communication through a main circuit, and a field-coil, of resistance devices in the main and field circuits, respectively, means for coregulating the currents in the main and field circuits through their respective resistances, and an additional rheostat in shunt across the respective resistances.

3. The combination with a system of electrical distribution, comprising a generator, storage battery, and translating devices, in electrical communication through a main circuit, a field-coil, and means of coregulating the currents in the field and main circuits, respectively, proportionately to the rate of speed of the generator, of means for short-circuiting the variable-resistance main circuit, in case of failure of current in the generator main circuit.

In testimony of all which I have hereunto subscribed my name.

JOHN L. CREVELING.

Witnesses:
CHAS. A. McCUNE,
EDW. C. SOFIO.